Oct. 16, 1956  R. R. DAGNEAU  2,766,524
OSCILLATING BLADE CUTTING APPARATUS, IN PARTICULAR
FOR SKINNING SLAUGHTERED ANIMALS
Filed July 14, 1955  2 Sheets-Sheet 1
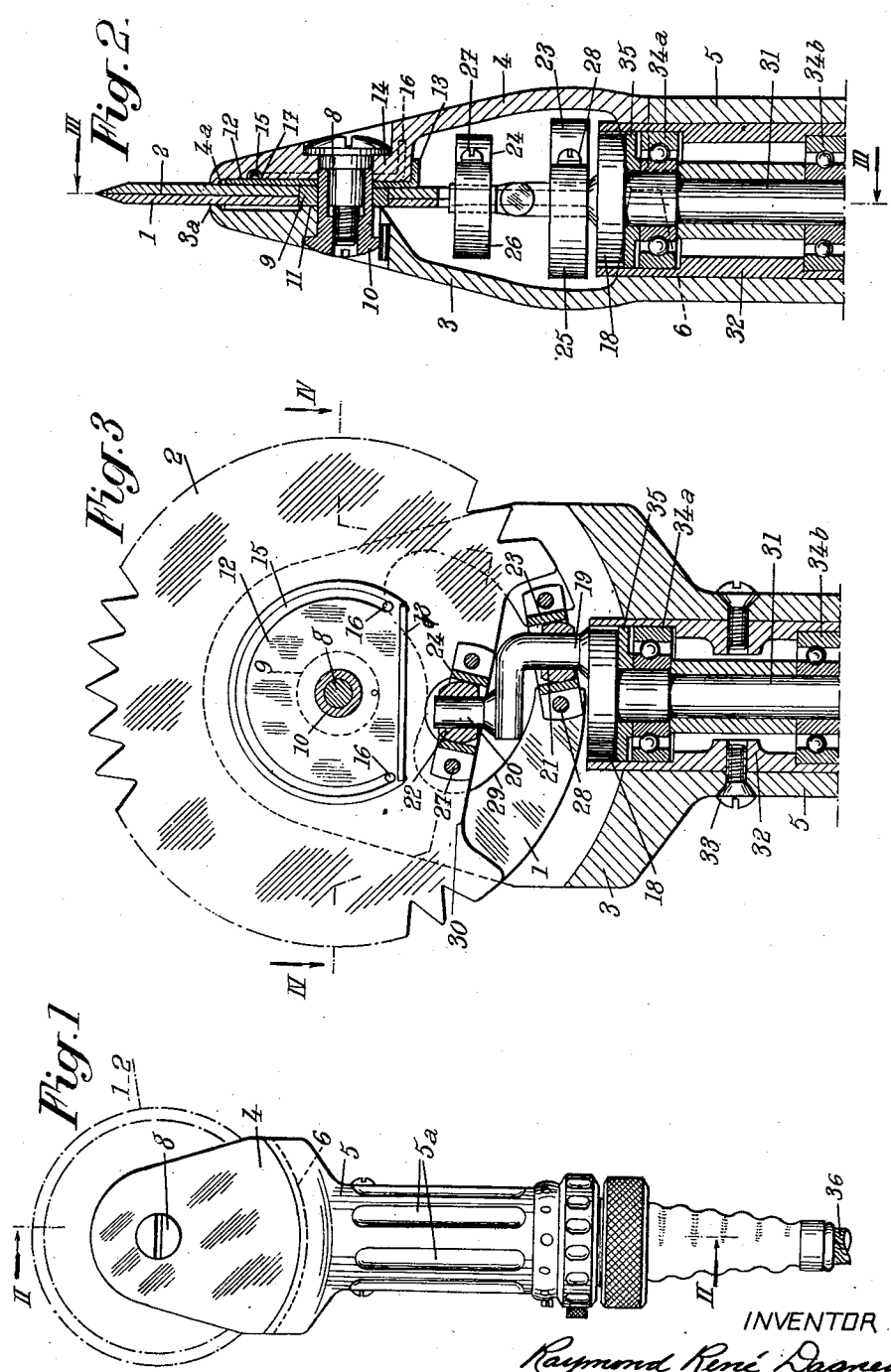
INVENTOR
Raymond René Dagneau
BY
Marshall, Marshall & Yeasting
ATTORNEY

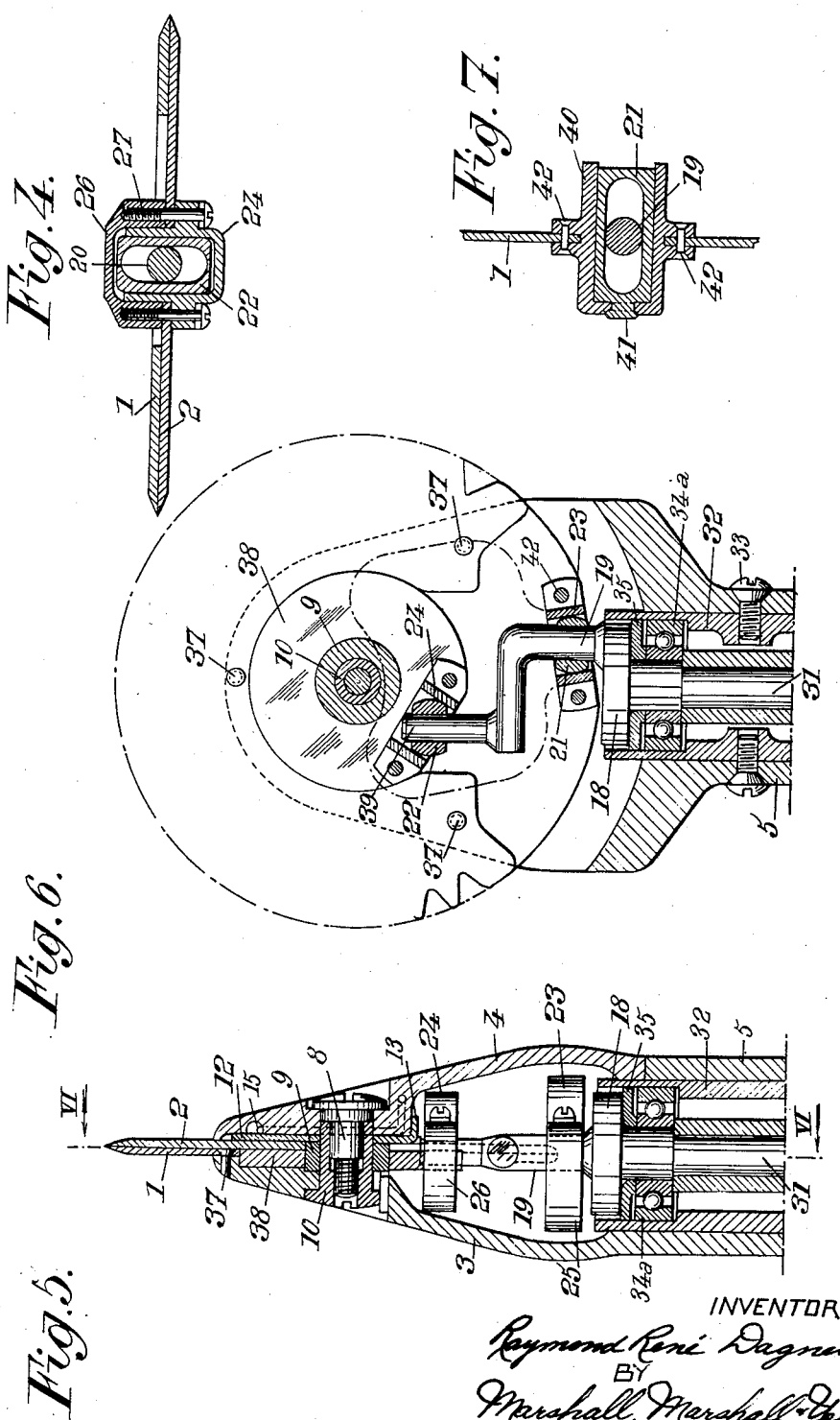

United States Patent Office 2,766,524
Patented Oct. 16, 1956

2,766,524

OSCILLATING BLADE CUTTING APPARATUS, IN PARTICULAR FOR SKINNING SLAUGHTERED ANIMALS

Raymond René Dagneau, La Courneuve, France, assignor to Societe Industrielle de Depouille Mecanique des Animaux, Paris, France, a society of France Application July 14, 1955, Serial No. 522,127

Claims priority, application France July 19, 1954

7 Claims. (Cl. 30—215)

The present invention relates to oscillating blade cutting apparatus and in particular to apparatus of this kind to be used for skinning slaughtered animals.

Such apparatus include a hollow handle containing a driving shaft journalled therein and at one end of which are mounted two juxtaposed blades a portion of the periphery of which is of general circular shape, said blades being rotatable with respect to each other about a common pivot axis passing through the centre of said circular peripheral portion and at right angles to the axis of said driving shaft.

The object of my invention is to provide an apparatus of this kind which is better adapted to meet the requirements of practice than those used at the present time, in particular which is free from vibration, of long duration, and of relatively small dimensions.

According to my invention, the driving shaft, the axis of which is located in the plane along which the two blades are adjoining each other, carries, at the end thereof close to said blades, two crank pins at 180° to each other slidably engaged, practically without play, in respective slideways, parallel to the blade pivot axis, provided each in an oscillating cylindrical member, said oscillating cylindrical members being pivotably mounted about respective axes parallel to but distant from said pivot axis, one in one of said blades and the other in another piece rotatable about said pivot axis and which may be the other blade.

Other features of my invention will become apparent in the course of the following detailed description of some embodiments of my invention with reference to the appended drawings, given merely by way of example and in which:

Fig. 1 is an elevational view of an apparatus according to my invention.

Fig. 2 is a view on a larger scale in section on the line II—II of Fig. 1.

Fig. 3 is a section on the line III—III of Fig. 2.

Fig. 4 is a horizontal sectional view on the line IV—IV of Fig. 3.

Figs. 5 and 6 are part views analogous to Figs. 2 and 3 respectively but relating to a modification.

Fig. 7 is a sectional view of a modification of the mechanism of Fig. 4.

In the embodiment illustrated by Figs. 1 to 3, two blades 1 and 2 are mounted in the end of a casing made of two parts 3 and 4 and a portion of which constitutes a cylindrical handle 5. Advantageously, this handle 5 is provided with grooves 5a.

Part 3 is rigid with handle 5, whereas part 4 is removably fixed thereto. It is provided with a joint 6 in the form of a circular arc (Fig. 1) engaged in a groove provided in the end of handle 5. Part 4 is fixed to part 3 by means of a screw 8. Between the fixed part 3 and removable part 4 are disposed the two blades 1 and 2, as shown in particular on Fig. 2. These blades, each of which is provided with a central hole, are mounted on a ring 9 which forms a kind of hub through which passes the nut 10 in which is engaged the screw 8. Ring 9 bears on one side against a circular surface 11 of part 3 and, on the other side, against a disc 12 engaged on nut 10 and the lower end of which is bent at 13 at right angles to its plane, so as to bear against a flat portion of a projection 14 of part 4.

Disc 12 is applied against blade 2 by a spring 15 the ends 16 of which, bent at right angles, are engaged in holes provided in the above mentioned projection 14. Furthermore this spring 15 is housed in a groove 17 provided in part 4. Initially this spring is so curved that, by its elasticity, it pushes disc 12 toward the left hand side of Fig. 2, the pressure that is exerted being transmitted to both of the blades 2 and 1. Blade 1 bears against a part-circular surface 3a provided along the edge of part 3. Owing to this arrangement, the blades are kept in position against each other without any substantial play and without undue pressure on each other, which makes it possible to obtain a smooth relative sliding of said blades. The blades are given oscillating movements in opposed directions respectively about an axis constituted by screw 8.

Of course, instead of making use of spring 15 as above described, I might use an elastic washer (not shown) surrounding nut 10 and interposed between part 4 and blade 2.

Part 4 is provided with a circular bearing surface 4a analogous to 3a.

Disc 12 on the one hand and bearing surfaces 3a and 4a on the other hand constitute liquid-tight means which prevent dirt coming from the animals from penetrating into the apparatus. The same arrangement also prevents lubricating oil located inside the casing from flowing out therefrom.

The reciprocating circular movement of the blades (in opposed directions respectively) is obtained by means of two crank pins 19 and 20 of cylindrical shape and circular section, as illustrated by Fig. 3. Crank pin 19 is connected to blade 1 and crank pin 20 to blade 2. Each of these crank pins 19 and 20 is connected with the corresponding blade through a cylindrical member 21 (for crank pin 19) and 22 (for crank pin 20). The generatrices of said cylindrical members 21, 22 are parallel to the axis of screw 8. Furthermore each of these cylindrical members 21, 22 is so located that the plane of the corresponding blade 1 or 2 passes through the middle of said cylindrical member.

Each of said cylindrical members 21, 22 is provided with a slideway extending in a direction parallel to the axis of screw 8. The slideway of cylindrical member 22 is visible on Fig. 4. The width of each slideway is substantially equal to the diameter of the crank pin engaged therein, which can therefore slide freely in the direction of said slideway. The length of the slideway depends upon the diameter of the circle along which the corresponding crank pin is rotating about the axis of the driving shaft 31 journalled in handle 5.

Each of said cylindrical members 21, 22 is engaged in a support of U-shape section 23, 24 respectively, itself engaged in a piece 25, 26. As shown by Fig. 4, pieces 24 and 26 extend on opposed sides respectively of blade 2 and are connected thereto by a screw 27. Pieces 23 and 25 are mounted in a similar way with respect to blade 1 and are connected thereto by screws 28 as shown on Fig. 2.

Crank pins 19 and 20 are supported by the driving shaft 31 through a disc 18 integral with said shaft. Shaft 31 is journalled in a sleeve 32 fitted in handle 5 and connected thereto by means of screws 33. Ball bearings 34a and 34b are interposed between shaft 31 and sleeve 32. A ring 35 is interposed between ball bearing 34 and crank disc 18. Shaft 31 may be driven for instance by means of a flexible transmission shaft 36 or in any other way, for instance by means of a compressed air motor (not shown) fed with compressed air through a flexible tube which is then located at the place shown for flexible shaft 36.

Of course, when blades 1 and 2 are made to oscillate by the rotation of driving shaft 31, cylindrical members 21 and 22 also oscillate with respect to their supports 23 and 24 about respective axes parallel to the axis of screw 8.

In order to give blades 1 and 2 the same angular velocity, crank pins 19 and 20 are disposed in such manner that the straight lines passing through the centre of each of the crank pins and the centre of the corresponding blade make equal angles with the axis of shaft 31.

In order to permit the fitting of the transmission parts 21 and 22 on the respective blades, said blades are provided with suitable notches, as shown at 29 for blade 1 and 30 for blade 2.

In some cases, when the skin of the animals to be treated is relatively thin, which is the case in particular for horses, calves, and so on, it may be advantageous to impart the rotary oscillating movement to only one of the blades.

Figs. 5 and 6 show a construction corresponding to this arrangement. In this case, only blade 2 is rotatable and blade 1 is fixed to part 3 by means of screws 37.

The drive of blade 2 is obtained in the same manner as above described.

In order to prevent vibrations as might result from the oscillating movement of only one blade, I provide a central member coaxial with blade 2 and driven in a direction opposed to that of said blade, the mass of said member being chosen so that the resistant torque it exerts is substantially equal and opposed in magnitude to that exerted by blade 2.

For this purpose, blade 1 is provided with a central hole in which is concentrically mounted a ring 38 of suitable thickness freely rotatable on central ring 9.

Ring 38 carries parts 24—26 and cylindrical member 22 in which is engaged a crank pin 39 analogous to the above mentioned crank pin 20.

In this case, in order to give to the relative movement of the oscillating blade the same value as in the preceding embodiment, the angular velocity of said movable blade with respect to the fixed part is increased, either by increasing the radius of rotation of crank pin 19 or by reducing the radial distance between the pivot axis of screw 8 and the point of blade 2 where crank pin 19 is acting on said blade.

Of course, both of these means may be used simultaneously.

Fig. 7 shows a modification of the arrangement of the oscillating cylindrical members on crank pins 19 and 20.

In the construction of Fig. 7, cylindrical member 21, which is provided with the slideway in which crank pin 19 is slidable, is guided by an axial extension 41 with respect to the part 40 in which said member 21 is engaged. Therefore part 21 can only oscilliate in part 40 about said axis. Sleeve 40 is engaged in a radial recess provided in blade 1 and is fixed to said blade by means of screws 42. A similar arrangement may be provided for cylindrical member 22 which receives crank pin 20.

Of course, in the arrangement of Fig. 7, the crank pin (such as 19) must be slidable along its axis with respect to the slideway provided in cylindrical member 21, whereas in the construction as illustrated by Figs. 2 and 3, the cylindrical members (such as 21 and 22) also have radial movements with respect to the pieces 23 and 24 in which they are engaged.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An oscillating blade cutting apparatus which comprises, in combination, a hollow handle, a driving shaft journalled longitudinally in said handle, a blade having a portion of its periphery of general circular shape, said blade being supported by said handle and being rotatable with respect to said handle about a pivot axis at right angles to the axis of said shaft and passing through the centre of said circular peripheral portion of said blade, a part rotatable with respect to said handle about said pivot axis, a member pivotally mounted in said blade about an axis parallel to but distant from said pivot axis, a member pivotally mounted in said part about an axis parallel to but distant from said pivot axis, each of said members being provided with a slideway having parallel walls parallel to said pivot axis, and two crank pins at 180° to each other carried by said shaft and engaged in said slideways respectively, the diameter of each of said crank pins being substantially equal to the distance between the parallel walls of the slideway in which it is engaged.

2. An oscillating blade cutting apparatus which comprises, in combination, a hollow shaft, a driving shaft journalled longitudinally in said handle, two blades having portions of their respective peripheries of general circular shape of the same radius, said blades being supported by said handle and both rotatable with respect to said handle about a pivot axis at right angles to the axis of said shaft and passing through the centre of said circular peripheral portion of said blades, two members each pivotally mounted in one of said blades respectively about an axis parallel to but distant from said pivot axis, each of said members being provided with a slideway having parallel walls parallel to said pivot axis, and two crank pins at 180° to each other carried by said shaft and engaged in said slideways respectively, the diameter of each of said crank pins being substantially equal to the distance between the parallel walls of the slideway in which it is engaged.

3. An apparatus according to claim 2 in which the points of said blades where said members are pivoted thereto are chosen so that the angular velocities of the two blades are substantially equal during their oscillations.

4. An apparatus according to claim 2 in which said blades are of general circular shape, with notches provided therein to permit movement of said crank pins respectively.

5. An apparatus according to claim 1 in which said members are both pivotally mounted on the parts which carry them and slidable with respect thereto in the radial direction.

6. An apparatus according to claim 1 in which said members are pivoted to the parts which carry them about respective axes fixed with respect to said parts.

7. An apparatus according to claim 1 including another blade concentric with the first mentioned blade, of the same radius and juxtaposed thereto, said second mentioned blade being carried in fixed position by said handle and the piece to which the second member is pivoted in a counter-balancing annular part.

No references cited.